Figure 6:
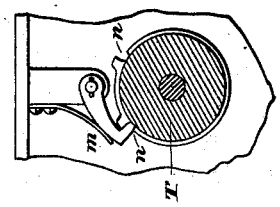
Figure 9:
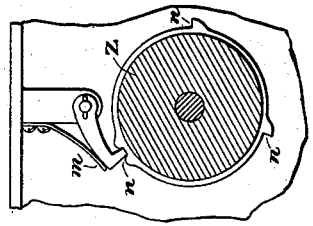

(No Model.) 3 Sheets—Sheet 1.
W. W. GRISCOM.
MEANS FOR PROPELLING VEHICLES BY SECONDARY BATTERIES.
No. 406,833. Patented July 9, 1889.
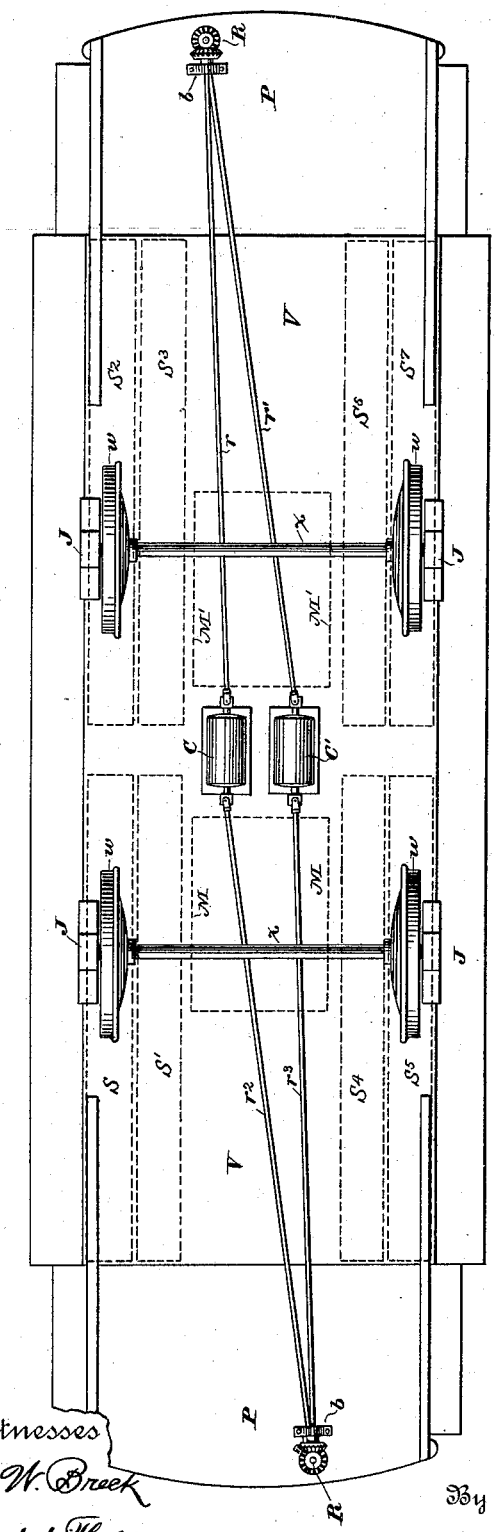

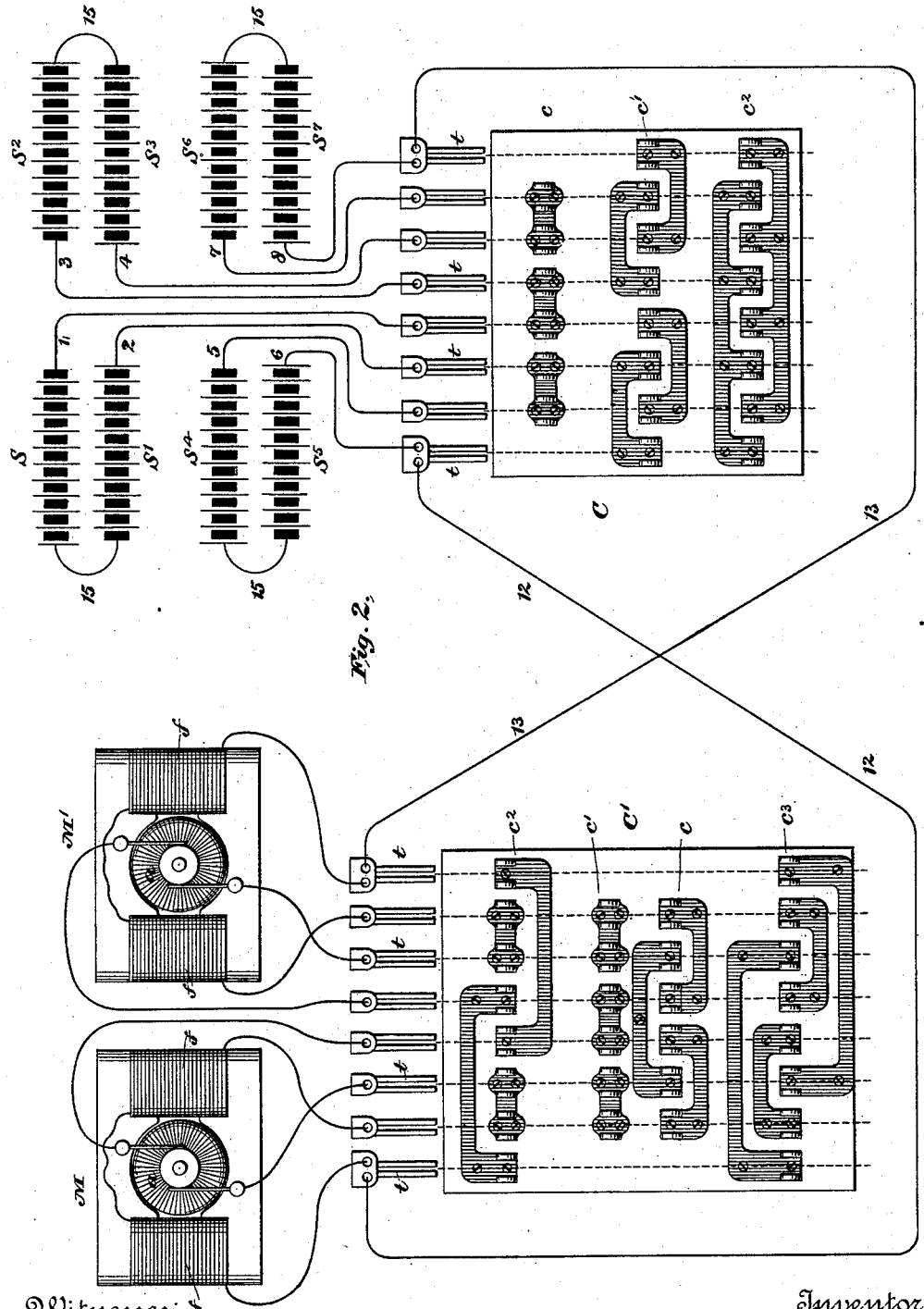

(No Model.) 3 Sheets—Sheet 3.

W. W. GRISCOM.
MEANS FOR PROPELLING VEHICLES BY SECONDARY BATTERIES.

No. 406,833. Patented July 9, 1889.

Witnesses
Geo. W. Breck
Edward Thorpe

Inventor
William W. Griscom
By his Attorney

UNITED STATES PATENT OFFICE.

WILLIAM W. GRISCOM, OF HAVERFORD COLLEGE, PENNSYLVANIA.

MEANS FOR PROPELLING VEHICLES BY SECONDARY BATTERIES.

SPECIFICATION forming part of Letters Patent No. 406,833, dated July 9, 1889.

Application filed March 20, 1889. Serial No. 303,986. (No model.)

*To all whom it may concern:*

Be it known that I, WILLIAM W. GRISCOM, a citizen of the United States, and a resident of Haverford College, in the county of Montgomery and State of Pennsylvania, have invented certain new and useful Improvements in Propelling Vehicles by Secondary Batteries, of which the following is a specification.

My invention is an improvement in the propulsion of vehicles by secondary batteries.

The improvement consists in dividing the total number of cells of a secondary battery into eight series and placing them in position in the plane of the wheels, two series of cells substantially equal in number being placed parallel in the plane of and adjacent to each wheel, thus distributing the weight equally over the four wheels of the car and dividing the battery into equal portable sections, which may be simultaneously and rapidly removed and replaced by eight gangs of men operating both from the inside and from the outside of the car. I place a switch having a series of contacts at some central point, and I connect the nearest terminals of each series of cells with the contact-points of this switch. The more distant ends of each two series of cells I connect together permanently. The switch-points are so arranged as to be capable of producing four different combinations of the secondary-battery cells to produce variations in electro-motive force and intensity of current. There are two motors—one for each axle of the car—and I provide a second switch for reversing the direction of rotation of the motors with respect to the battery to produce a reversal in the direction of movement and also to produce a change in the connection of said motors with respect to each other, as from series to parallel circuit, and vice versa. I place these two switches at the center of the car and preferably under the floor thereof, and I provide means for operating these switches from either platform of the car, consisting of compound shafts with universal joints and bevel-gears, so combined and arranged as to permit of operating one switch independently of the other.

The accompanying drawings illustrate my invention.

Figure 1 is a plan view of the car-floor, showing the location of the batteries, the switches under the floor, and the compound levers for operating them. Fig. 2 is a diagrammatic view showing the arrangement of the cells on the floor of the car in the plane of the wheels, the two motors, and the two switches, the cylindrical surface of the latter being produced or arranged as a plane surface to more closely show the arrangement of contacts. Fig. 3 is a side view of the compound shafts and switch. Figs. 4, 5, 6, 7, 8, and 9 and sectional views of the switches.

V, Fig. 1, shows the floor of a street-car having four wheels $w$, each pair being united by axles $x$. Motors M M' are located under the floor, and are mechanically connected each with an axle $x$. Journals J are located at opposite ends of the axles to carry the car frame and structure. A number of cells of a secondary battery—say eighty—are equally divided into eight series S to $S^7$, and two series arranged parallel are placed in the plane of, adjacent to, and immediately over each wheel $w$. The diagrammatic plan view, Fig. 2, shows the arrangement of these cells. A multiple contact-switch or circuit-changer C is placed at or near the center of the car and preferably under the floor. The free terminals of adjacent ends of each series of cells, 1 to 8, are connected to fixed terminals $t$ of the switch C. The opposite and more distant terminals of each two parallel series of cells are permanently connected together by a conductor 15.

Figure 4:
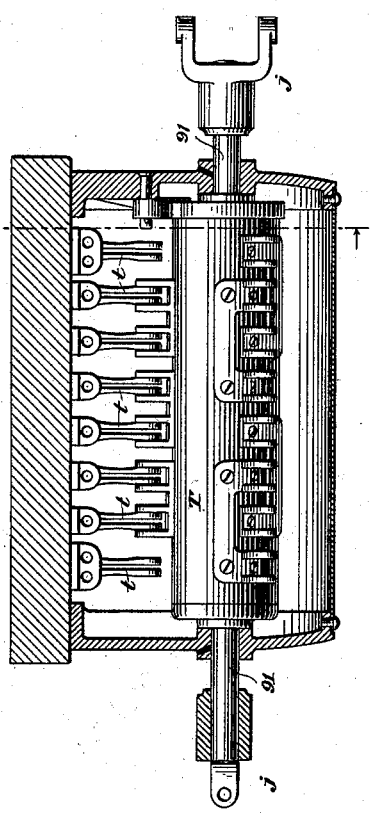
Figure 7:
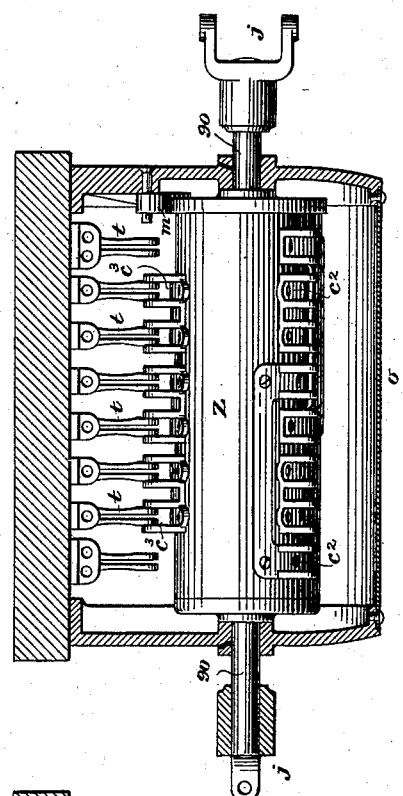

The switch C has a cylinder T, Fig. 4, bearing three rows of contact-points registering with the fixed terminals $t$. This cylindrical surface is shown in Fig. 2 as a plane surface to more clearly exhibit the arrangement and sequence of these contacts.

Figure 5:
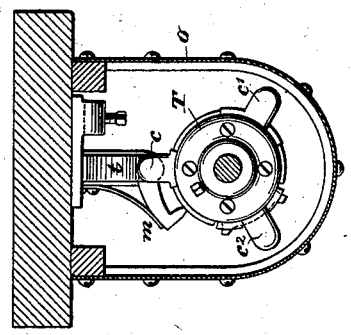
Figure 8:
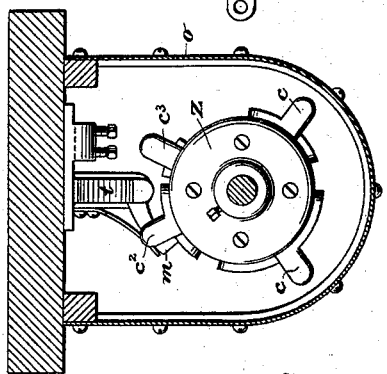

Referring to Figs. 2, 4, and 5, the three rows of contacts are shown at $c\ c'\ c^2$. When row $c$ is placed in contact with the terminals $t$, all the cells are in series and we have the electro-motive force due to eighty cells. When row $c'$ is in contact with terminals $t$, we have the electro-motive force due to forty cells and the intensity of current due to two series of cells in parallel. When row $c^2$ is in contact with terminals $t$, we have the electro-motive force due to twenty cells and the intensity of current due to four series in parallel.

The connection of the motors with respect to each other and with respect to the battery is varied by the switch C'. The connections of this switch are also shown in Fig. 2. The construction of the switch is very similar to switch C.

Z is a cylinder of insulating material, and there are four rows of contacts registering with a series of fixed terminals $t$. The opposite terminals of each field-coil $f$ and the opposite terminals of each armature-wire $a$ are permanently connected to the terminals $t$, respectively.

When the row of contacts $c$ is in connection with terminals $t$, the fields and armatures of both motors are connected in series, the current passing through both fields and armatures in one direction—say the first.

When the row $c'$ is in contact with terminals $t$, the field and armature wires are connected in series, but the current passes through the armatures in an opposite direction to that first described—say the second. This is for the purpose of producing a reversal of movement or motion of the motors and therefore of the car.

When row of contacts $c^2$ is in engagement with the terminals $t$, the fields are in parallel circuit and the armatures are in parallel circuit, the direction of current in the armatures being that above designated as the first direction and the same as that in case of contacts $c$.

When the row of contacts $c^3$ is in engagement with the terminals $t$, the fields are in parallel circuit and the armatures are in parallel circuit, the direction of current in the armatures being that above designated as the second direction, or the same as that in case of contacts $c^2$.

To summarize, contacts $c$ and $c'$ connect armatures and fields in series, the direction of currect through the armatures being reversed in one case with respect to the other.

Contacts $c^2$ and $c^3$ connect armatures and fields in parallel circuit, the direction of current through the armatures being reversed in one case with respect to the other.

The direction of current in the fields is the same in each and every case.

The switches C and C' are operated from either platform P. The drums of insulating material bearing rows of contact-points, as described, are located upon suitable bearings 90 and 91. At each end of bearings 90 and 91 there is a joint $j$, capable of movement in two directions at respectively right angles. This joint is designated by me and is for all practical purposes a "universal joint." Switch C is connected by rods of iron $r$ and $r^2$ with the two platforms P. Switch C' is connected by rods $r'$ and $r^3$ with said platforms. Under each platform there is a bearing $b$ for each pair of rods. Each rod $r$ and $r'$, Fig. 3, has at its platform end a bevel-gear $g'$ and $g^3$. At each platform there is a compound vertical shaft R, composed of a tubular shaft $q$, and a rod $p$, located within said tubular shaft. The compound shaft has bearings in the car-platform. On shaft $q$ there is a bevel-gear $g$, meshing with gear $g'$ on rod $r$. On rod $p$ there is a bevel-gear $g^2$, meshing with gear $g^3$ on rod $r'$. A wheel $h$ on rod $q$ provides means for operating said rod, and a wheel W on $p$ provides means for operating that rod. Rods $r^2$ and $r^3$ are similarly arranged, and connect a compound rod R on the opposite platform of the car with the opposite ends of switches C C' in a similar manner.

The construction of the switches C and C' is clearly shown in Figs. 4 to 9, inclusive. Cylinders of insulating material T and Z are placed upon arbors journaled at 90 and 91. A series of fixed bifurcated terminals of cast-brass are fixed to a base-block or the bottom of the car V. On the surface of these cylinders T and Z the rows of contacts above described are located in lines parallel with the axis of the cylinders. On the surface of each cylinder there is a notch $n$ for each row of contacts, and a spring-actuated catch $m$ is fixed in position. The notches $n$ are so arranged with respect to the catch $m$ that each row of contacts when engaging with the fixed terminals $t$ is caught and held until sufficient force is applied to rotate the cylinder or switch. Each switch is inclosed by a covering of insulating material $o$, fixed to the base-block or bottom of the car, thus excluding dust and dirt and protecting the apparatus from injury.

The operation of the apparatus constructed and arranged subtantially as described is apparent from the above description and an inspection of the drawings.

What I claim, and desire to secure by Letters Patent, is—

1. The combination of a vehicle having four or more wheels mechanically united in pairs, two or more electric motors, one for each pair of wheels, mechanically connected thereto, a number of cells of secondary battery divided into eight substantially equal series, two series being located in parallel planes in the plane of and adjacent to each wheel, a permanent electrical connection between the more distant ends of each such parallel series, a switch or circuit-changer located at a central point, having a series of fixed contacts, one for each free terminal of each series of cells, two or more series of movable contacts registering with said fixed terminals to produce two or more variations in the connection of such cells with respect to each other, and a second switch or circuit-changer located in proximity to the first switch, consisting of a series of fixed terminals having an electrical connection with the terminals of both motor-armatures, with the terminals of both field-magnets, and with the terminals of the battery, respectively, and a series of movable contacts for varying the connection of said fixed terminals with respect to each other, whereby said motors may be connected in series or in parallel with respect to the battery, the cells of which may be similarly varied in connection with respect to each other and to said motors, substantially as described.

2. The combination of a wheeled vehicle, an electric motor carried thereby and connected with said wheels to produce rotation thereof, a series of cells of secondary battery carried by said vehicle and connected in circuit with said motors, two switches or circuit-changers located at or near the center of the car, each consisting of a series of fixed terminals and a series of movable contact-points, a shaft for each switch extending from said switch to the platform of the car, containing a universal joint, and a compound shaft at said platform for operating both shafts, substantially as described, whereby the connections of the cells may be varied with respect to each other and the connection of said motors may be varied with respect to the battery and to each other.

3. The combination of a wheeled vehicle, one or more electric motors for propelling said vehicle, a series of cells of battery in circuit with the motor and carried by said vehicle, and two or more switches for varying the connection of the battery with respect to the motors, and vice versa, two rods connecting with the switches, one rod for each switch, and a compound shaft, substantially as described, for operating each rod independently.

4. The combination of a wheeled vehicle, one or more electric motors for propelling said vehicle, a series of cells of battery in circuit with the motor and carried by said vehicle, two or more switches located at or near the center of the car for varying the connection of the battery with respect to the motors, two rods extending from each platform to one end of each switch, and a compound shaft at each platform, substantially as described, for controlling each switch independently.

5. The combination of a wheeled vehicle, two or more electric motors mechanically connected to two or more wheels, respectively, a number of cells of secondary battery divided into eight substantially equal series, two series being located in parallel planes in the plane of and adjacent to each wheel, a permanent electrical connection between the more distant ends of each such parallel series, a switch or circuit-changer located at a central point having a series of fixed contacts, one for each free terminal of each series of cells, two or more series of movable contacts registering with said fixed terminals to produce two or more variations in the connection of such cells with respect to each other, and a second switch or circuit-changer located in proximity to the first switch, consisting of a series of fixed terminals having an electrical connection with the terminals of both motor-armatures, with the terminals of both field-magnets, and with the terminals of the battery, respectively, and a series of movable contacts for varying the connection of said fixed terminals with respect to each other, whereby said motors may be connected in series or in parallel with respect to the battery, the cells of which may be similarly varied in connection with respect to each other and to said motors, substantially as described.

Signed at New York, in the county of New York and State of New York, this 7th day of March, A. D. 1889.

WILLIAM W. GRISCOM.

Witnesses:
    DANIEL E. DELAVAN,
    F. D. L. WALKER.